March 22, 1949.     O. W. INSKEEP     2,465,098
WHEEL SUSPENSION

Filed Dec. 5, 1945                    2 Sheets-Sheet 1

INVENTOR.
Oliver W. Inskeep
BY
ATTYS

March 22, 1949.  O. W. INSKEEP  2,465,098
WHEEL SUSPENSION
Filed Dec. 5, 1945   2 Sheets—Sheet 2
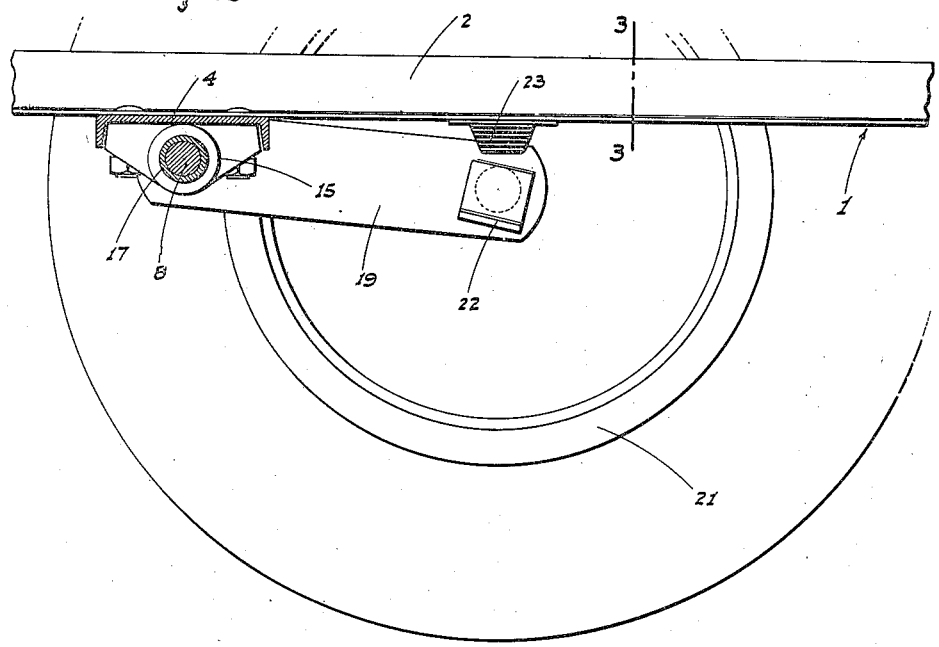
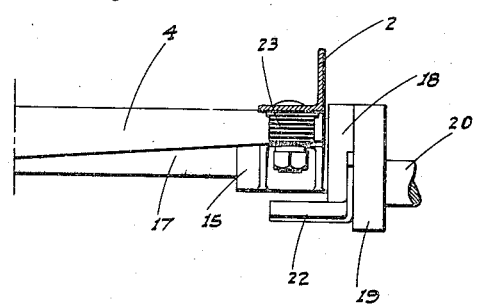
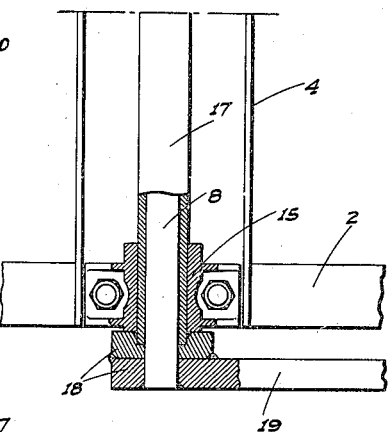
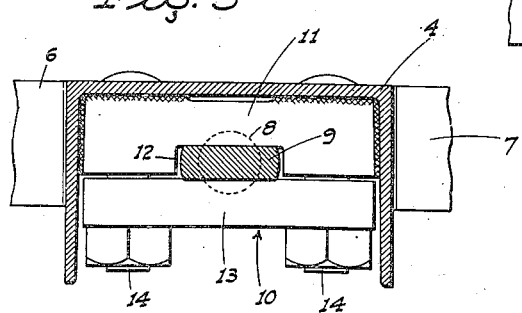
INVENTOR.
Oliver W. Inskeep
BY
Webster & Webster
ATTYS Patented Mar. 22, 1949

2,465,098

UNITED STATES PATENT OFFICE 2,465,098

WHEEL SUSPENSION

Oliver W. Inskeep, Stockton, Calif., assignor to Harris Manufacturing Company, Stockton, Calif., a corporation Application December 5, 1945, Serial No. 632,827

2 Claims. (Cl. 267—57)

The present invention relates in general to an improved wheel suspension for vehicles, and particularly for trailers such as two-wheel utility trailers and the like.

An object of the present invention is to provide a wheel suspension for vehicles, wherein the springing of the wheels is accomplished through the medium of an axle which serves as a combination wheel support and a torque spring; the wheels being crank mounted on opposite ends of such axle.

Another object of this invention is to provide a wheel suspension, as in the preceding paragraph, in which the torque spring axle is a one-piece alloy steel bar journaled adjacent its outer ends in connection with the vehicle frame, and clamped centrally of its ends to said frame and against rotation, by novel clamping means.

A further object is to provide a novel bearing sleeve arrangement operative to prevent radial deflection of the torque spring axle intermediate its ends when the wheel suspension is in use.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 2 is an enlarged fragmentary longitudinal section through the axle assembly and looking toward one wheel.

Figure 3 is a fragmentary cross section on line 3—3 of Fig. 2.

Figure 4 is an enlarged fragmentary plan view, partly in section, of one bearing sleeve, journal, and crank arm assembly.

Figure 5 is an enlarged, fragmentary cross section showing the clamping arrangement for the axle centrally of its ends.

Figure 1:
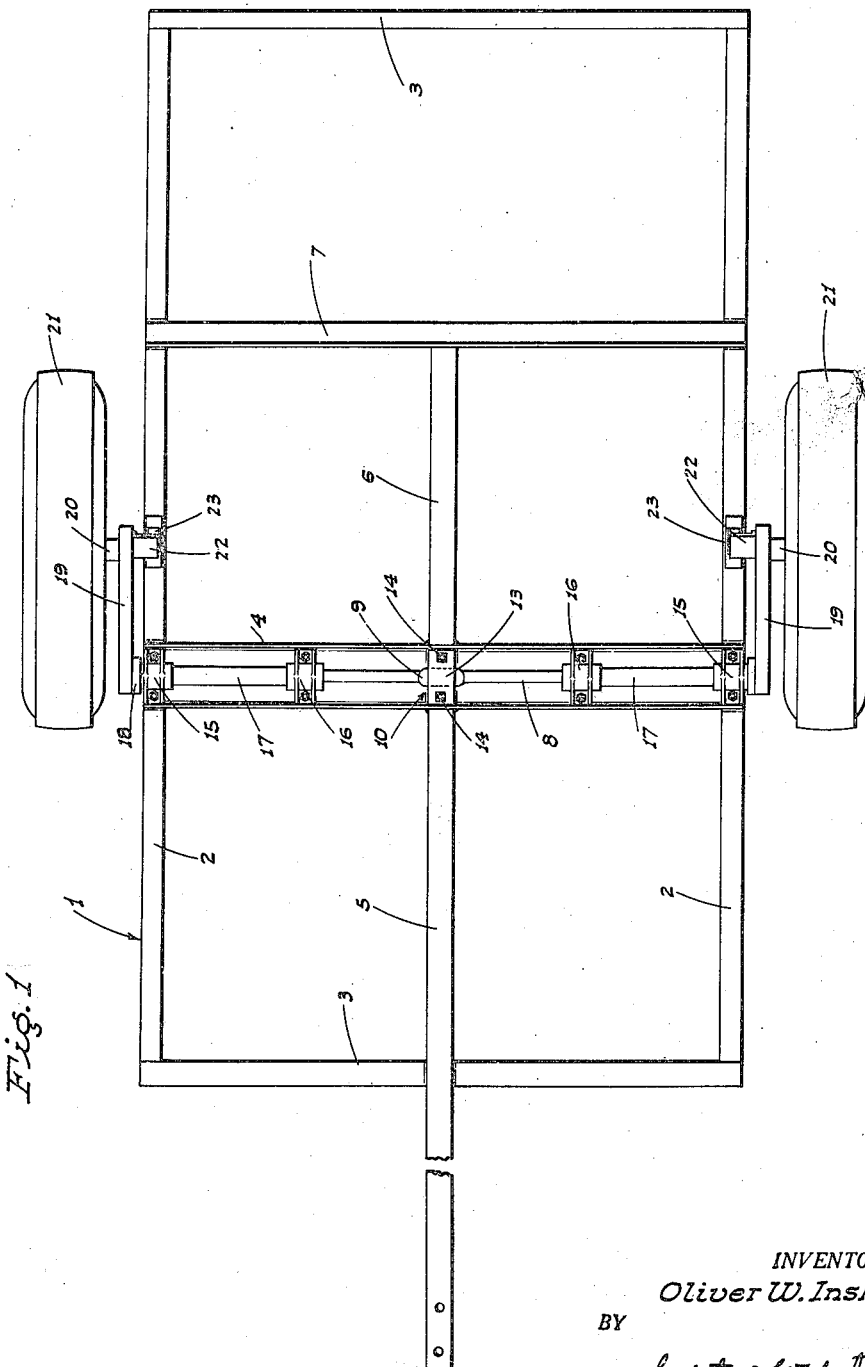
Figure 1 is a bottom plan view of a two-wheel trailer frame incorporating the present invention.

Referring now more particularly to the characters of reference on the drawings, the invention is here shown as embodied in connection with a rigid, rectangular trailer frame, indicated generally at 1, which frame includes transversely spaced, parallel side beams 2 connected together by end beams 3.

Intermediate the end beams 3, but slightly ahead of the center of the frame 1, the latter is provided with a transverse, downwardly opening heavy-duty channel 4, welded at opposite ends to the side beams 2. A draft tongue 5 is welded to and extends forwardly to a point ahead of the frame 1, being welded to the front end beam 3 at the point of intersection therewith. In addition, a longitudinal frame member 6 is welded to and extends rearwardly from the channel 4 in alinement with the draft tongue 5, and at its rear end said frame member 6 is secured to a cross bar 7 included in the frame.

A continuous or one-piece axle 8 extends from side to side of the frame 1 in the channel 4, and said axle is flattened, centrally of its ends, as at 9, and such flattened portion is secured in a clamping unit, indicated generally at 10.

The clamping unit 10 comprises a top clamping block 11 fixed in the channel 4 transversely thereof and in downwardly facing relation; said top clamping block 11 including a downwardly opening cross notch 12 therein for the reception of the flattened portion 9 of the axle 8. Said flattened portion of the axle 8 is of slightly greater thickness than the depth of the notch, and a bottom clamping block 13, symmetrical to the top clamping block 11, engages the flattened portion 9 from below, as clearly shown in Fig. 5. Clamping bolts 14 connect the top clamping block 11 and bottom clamping block 13 on opposite sides of the flattened portion 9 of the axle, and said bolts 14 are normally tightened, whereby to forcefully engage said portion 9 against rotation.

Journals 15 are mounted in the outer ends of the channel 4 in alinement with the side beams 2, and other journals 16 are mounted in said channel substantially centrally between the clamping unit 10 and the journals 15. Bearing sleeves 17 are rotatably mounted, at opposite ends, in the journals 15 and 16 and extend therebetween.

The outer end portions of the axle 8, which axle is formed of a round, alloy steel bar, extend with a relatively close but turnable fit through the bearing sleeves 17 and terminate a short distance outwardly thereof.

At their outer ends, the one-piece axle 8, as well as the sleeves 17, are fixedly attached to the hub 18 of crank arms 19 which are normally disposed at a rearward and slight downward incline, as shown in Fig. 2; said crank arms including at their outer or rear ends, laterally outwardly projecting spindles 20 on which pneumatic-tired wheels 21 are mounted.

The crank arms 19 are fitted, adjacent their rear ends, with laterally inwardly projecting stops 22 normally disposed in clearance relation below the corresponding side beam 2, but adapted to engage resilient bumpers 23 on the under side of said side beams upon predetermined upward swinging movement of the crank arms 19.

The spring action or springing of the wheels 21 results from the resiliency or torque of the corresponding portions of the axle 8, which axle is clamped against rotation in the center, as described. As the portions of the axle on opposite sides of the clamping unit 10 are journaled for rotation, a twisting action is imparted to the corresponding axle portion upon relative upward movement of the adjacent wheel 21, as the vehicle traverses uneven ground. This twisting loads the axle portions so that they in effect become torque springs, resisting such upward movement of the wheels and tending to stabilize the same.

While the wheel suspension is relatively simple in its construction it provides a practical and effective means for springing the wheels of vehicles, such as utility trailers; the construction being such that a minimum of service, repair, or replacement is necessary.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. In combination, a vehicle body, a downwardly opening channel shaped element fixed to the bottom of the body, spaced journals disposed in the channel element adjacent each end thereof, said journals being secured within the channel element for ready removal therefrom downwardly through the open lower side thereof, a wheel suspension unit comprising an axle, sleeves mounted on said axle adjacent its ends, crank arms fixed to the ends of the axle and sleeves, wheels journaled on the outer ends of the crank arms, the sleeves being turnably mounted in said journals.

2. A combination as in claim 1 in which the axle is of torque spring material and is clamped in the channel intermediate its ends, the clamping element for the axle being readily removable through the open lower side of the channel.

OLIVER W. INSKEEP.

REFERENCES CITED

The following references are of record in the file of this patent:

UNITED STATES PATENTS

| Number    | Name        | Date           |
|-----------|-------------|----------------|
| 2,060,015 | Barnes et al. | Nov. 10, 1936 |
| 2,175,562 | Frohlich    | Oct. 10, 1939  |
| 2,194,964 | Willson     | Mar. 26, 1940  |
| 2,227,762 | Ronning     | Jan. 7, 1941   |
| 2,254,261 | Best        | Sept. 2, 1941  |
| 2,256,069 | Wagner      | Sept. 16, 1941 |
| 2,297,465 | Froehlich   | Sept. 29, 1942 |